United States Patent
Kim et al.

(10) Patent No.: US 9,007,315 B2
(45) Date of Patent: Apr. 14, 2015

(54) FLEXIBLE DISPLAY DEVICE AND METHOD OF SENSING WARPAGE OF THE SAME

(75) Inventors: Dae-Won Kim, Yongin (KR); Jun-Ho Kwack, Yongin (KR); Young-Sik Kim, Yongin (KR)

(73) Assignee: Samsung Display Co., Ltd. (KR)

( * ) Notice: Subject to any disclaimer, the term of this patent is extended or adjusted under 35 U.S.C. 154(b) by 240 days.

(21) Appl. No.: 13/604,332

(22) Filed: Sep. 5, 2012

(65) Prior Publication Data

US 2013/0300677 A1   Nov. 14, 2013

(30) Foreign Application Priority Data

May 8, 2012 (KR) .................. 10-2012-0048827

(51) Int. Cl.
*G06F 3/041* (2006.01)
*G06F 3/044* (2006.01)

(52) U.S. Cl.
CPC .............. *G06F 3/0414* (2013.01); *G06F 3/044* (2013.01); *G06F 2203/04102* (2013.01)

(58) Field of Classification Search
CPC ........ G06F 3/041; H05K 1/147; H05K 1/144; H05K 2201/052; H05K 3/323; H05K 3/361
USPC .................... 345/156–184; 178/18.01–20.04; 174/254; 341/20–27; 156/60; 200/511–512, 5 A, 600, 310–317
See application file for complete search history.

(56) References Cited

U.S. PATENT DOCUMENTS

| | | | | |
|---|---|---|---|---|
| 7,830,366 B2* | 11/2010 | Tanabe et al. | ................. | 345/173 |
| 2003/0227441 A1* | 12/2003 | Hioki et al. | ................. | 345/156 |
| 2009/0153510 A1* | 6/2009 | Jiang et al. | ................. | 345/173 |
| 2009/0310314 A1* | 12/2009 | Shinn et al. | ................. | 361/749 |
| 2010/0053081 A1* | 3/2010 | Jee et al. | ................. | 345/157 |
| 2010/0056223 A1 | 3/2010 | Choi et al. | | |
| 2010/0093247 A1* | 4/2010 | Jiang et al. | ................. | 445/24 |
| 2010/0120470 A1* | 5/2010 | Kim et al. | ................. | 455/566 |
| 2010/0141605 A1 | 6/2010 | Kang et al. | | |
| 2010/0188346 A1* | 7/2010 | Yamauchi et al. | ............ | 345/173 |
| 2010/0207880 A1* | 8/2010 | Shaver et al. | ................. | 345/158 |
| 2011/0086680 A1 | 4/2011 | Kim et al. | | |
| 2011/0148745 A1* | 6/2011 | Stryakhilev et al. | ............ | 345/80 |
| 2011/0187681 A1 | 8/2011 | Kim et al. | | |

(Continued)

FOREIGN PATENT DOCUMENTS

KR 10-2010-0027501 A 3/2010
KR 10-2010-0050318 A 5/2010

(Continued)

*Primary Examiner* — Allison Johnson
*Assistant Examiner* — Vinh Lam
(74) *Attorney, Agent, or Firm* — Knobbe, Martens, Olson & Bear LLP

(57) ABSTRACT

A flexible display device includes: a flexible display unit configured to display an image; a flexible touch screen unit disposed over the flexible display unit; an insulating film interposed between the flexible display unit and the flexible touch screen unit, and a spacer formed between the flexible touch screen unit and the insulating film in order to maintain a distance between the flexible touch screen unit and the insulating film. A conductive layer is further formed over the insulating film and configured to touch the flexible touch screen unit when the flexible display device is bent. A degree of warpage of the flexible display device can be measured and thus can be utilized in various warpage events of the flexible display device by using warpage values.

22 Claims, 6 Drawing Sheets

(56) References Cited

U.S. PATENT DOCUMENTS

| | | | |
|---|---|---|---|
| 2011/0261003 A1* | 10/2011 | Lee et al. | 345/174 |
| 2011/0291983 A1* | 12/2011 | Yao | 345/174 |
| 2012/0002127 A1* | 1/2012 | Yamazaki et al. | 349/43 |
| 2012/0032927 A1* | 2/2012 | Kim et al. | 345/176 |
| 2012/0115422 A1* | 5/2012 | Tziortzis et al. | 455/73 |
| 2012/0242588 A1* | 9/2012 | Myers et al. | 345/173 |
| 2012/0242610 A1* | 9/2012 | Yasumatsu | 345/173 |
| 2012/0249413 A1* | 10/2012 | Sugahara | 345/156 |
| 2012/0319976 A1* | 12/2012 | Ahn et al. | 345/173 |
| 2013/0032861 A1* | 2/2013 | Lee et al. | 257/254 |
| 2013/0135244 A1* | 5/2013 | Lynch et al. | 345/174 |
| 2013/0285938 A1* | 10/2013 | Kang et al. | 345/173 |
| 2013/0300678 A1* | 11/2013 | Kang et al. | 345/173 |
| 2014/0028584 A1* | 1/2014 | Park et al. | 345/173 |

FOREIGN PATENT DOCUMENTS

| | | |
|---|---|---|
| KR | 10-2010-0065418 A | 6/2010 |
| KR | 10-2011-0040474 A | 4/2011 |
| KR | 10-2011-0088872 A | 8/2011 |

* cited by examiner

FLEXIBLE DISPLAY DEVICE AND METHOD OF SENSING WARPAGE OF THE SAME

CROSS-REFERENCE TO RELATED PATENT APPLICATIONS

This application claims the benefit of Korean Patent Application No. 10-2012-0048827, filed on May 8, 2012, in the Korean Intellectual Property Office, the disclosure of which is incorporated herein in its entirety by reference.

BACKGROUND

1. Field

The present disclosure relates to a flexible display device that senses warpage of the flexible display device, and a method of sensing warpage of the flexible display device.

2. Discussion of the Related Technology

Generally, flat display devices may be classified into light-emitting type flat display devices and light-receiving type flat display devices. Light-emitting type flat display devices include organic light-emitting display devices, plasma display panels (PDPs), cathode ray tubes (CRTs), vacuum fluorescent displays (VFDs), light emitting diodes (LEDs), and the like. Light-receiving type flat display devices include liquid crystal display (LCD) devices.

Organic light-emitting display devices among these flat display devices have superior characteristics such as wide viewing angles, excellent contrast, and short response times. Thus, the organic light-emitting display devices have been in the spotlight because they can be applied to display devices for mobile devices, such as digital cameras, video cameras, camcorders, portable information terminals, smart phones, ultra-slim laptop computers, or tablet personal computers (PCs), or electronic/electric products, such as ultra-thin TVs.

Flexible display devices that are easily carried and can be applied to various types of devices have been recently studied and developed for next generation display devices. Flexible display devices based on an organic light-emitting display technology among them are the most powerful display devices. A touch function can be applied to flexible display devices.

SUMMARY

One or more embodiments of the present invention provide a flexible display device that may measure and utilize warpage of the flexible display device, and a method of sensing warpage by using the flexible display device.

According to an aspect of the present invention, there is provided a flexible display device including: a flexible display unit configured to display an image; a flexible touch screen unit disposed over the flexible display unit; an insulating film interposed between the flexible display unit and the flexible touch screen unit, and a spacer formed between the flexible touch screen unit and the insulating film in order to maintain a distance between the flexible touch screen unit and the insulating film, wherein a conductive layer is formed over the insulating film and configured to touch the flexible touch screen unit when the flexible display device is bent.

The insulating film may be attached to a top surface of the flexible display unit, and the flexible touch screen unit may be spaced from the insulating film by the spacer, and a gap may be formed between the flexible touch screen unit and the insulating film.

The conductive layer may include a patterned shape formed over a surface of the insulating film that faces the flexible touch screen unit.

The conductive layer may include a first conduction portion extending along a first edge of the insulating film and a second conduction portion extending along a second edge that crosses the first edge and connected to the first conduction portion.

The conductive layer may be formed over the substantially entire surface of the insulating film facing the flexible touch screen unit.

The conductive layer may include a first conduction portion extending along a first direction parallel to a surface of the insulating film and a second conduction portion extending along a second direction that crosses the first direction and is parallel to the surface of the insulating film.

The conductive layer may include a lattice pattern formed over the insulating film.

The conductive layer may be formed of a transparent material.

The insulating film may include a polarizer plate.

The flexible touch screen unit may include one selected from the group consisting of an electrostatic capacitive type touch unit, a resistive type touch unit, an electro-magnetic type touch unit, a surface acoustic wave type touch unit, a saw type touch unit, and an infrared type touch unit.

The flexible touch screen unit may include: a flexible touch substrate; a plurality of electrode patterns including a plurality of first electrode patterns and a plurality of second electrode patterns formed over the flexible touch substrate; and an insulating layer insulating between the plurality of first electrode patterns and the plurality of second electrode patterns, and the first electrode patterns and the second electrode patterns configured to sense contact between the flexible touch screen unit and the conductive layer so as to generate electrical signals.

A plurality of first electrode patterns may be arranged to be spaced apart from each other in a first direction parallel to a surface of the flexible touch substrate, and a plurality of second electrode patterns may be arranged to be spaced apart from each other in a second direction that crosses the first direction and is parallel to the surface of the flexible touch substrate.

The first electrode patterns and the second electrode patterns may be placed at the substantially same elevation with reference to the flexible touch substrate and may be buried to be insulated from each other by an insulating layer.

The insulating layer may include contact holes formed in areas in which the first electrode patterns and the second electrode patterns cross one another, and each of the plurality of first electrode patterns may include first electrodes electrically connected by a plurality of first connectors, and each of the plurality of second electrode patterns may include second electrodes electrically connected by a plurality of second connectors that are formed in the contact holes and cross the insulating layer.

A passivation and/or planarization layer may be further formed over the insulating layer in order to cover the plurality of second connectors.

A cover window may be further formed over the flexible touch screen unit.

The flexible display unit may include: a flexible display substrate; a thin film transistor formed over the flexible display substrate; and an organic light-emitting device connected to the thin film transistor and including a first electrode, a second electrode, and an organic layer interposed between the first electrode and the second electrode.

According to another aspect of the present invention, there is provided a method of sensing warpage of a flexible display device, the method including: bending a flexible display device including a flexible display unit, a flexible touch screen unit disposed over the flexible display unit, an insulating film interposed between the flexible display unit and the flexible touch screen unit, a conductive layer formed over the insulating film, and a spacer for maintaining a distance between the flexible touch screen unit and the insulating film in one direction; when the flexible touch screen unit, the insulating film, and the flexible display unit are bent in a same direction, allowing a portion of the flexible touch screen unit to contact a portion of the conductive layer formed over a facing surface of the insulating film; and measuring a degree of warpage of the flexible display device at a bent point.

The flexible touch screen unit may measure variation in electrostatic capacitance.

A plurality of first electrode patterns and a plurality of second electrode patterns may be formed over a flexible touch substrate of the flexible touch screen unit, and wherein a variation in electrostatic capacitances between the plurality of first electrode patterns and the plurality of second electrode patterns at a point where the flexible touch screen unit contacts the conductive layer when the flexible display device is bent, may be measured.

According to another aspect of the present invention, there is provided a method of operating a flexible display device, the method including: providing a flexible display device including a flexible display unit, a flexible touch screen unit disposed over the flexible display unit, an insulating film interposed between the flexible display unit and the flexible touch screen unit, a conductive layer formed on the insulating film, and a spacer for maintaining a distance between the flexible touch screen unit and the insulating film in one direction; touching a flexible display device; determining whether there is an application for measuring warpage of the flexible display device; determining whether there is a warpage event of the flexible display device, determining whether the warpage event is a variation of a particular region of the flexible display device; determining whether the flexible display device varies on an X-axis and a Y-axis; and handling the warpage event in each of directions of the X-axis and the Y-axis.

When a bent portion of the flexible touch screen unit contacts the conductive layer formed over the insulating film, the flexible display device may sense a variation of electrostatic capacitances between first electrode patterns and second electrode patterns of the flexible touch screen unit at the bent portion so as to measure a degree of warpage of the flexible display device.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS

Figure 1:
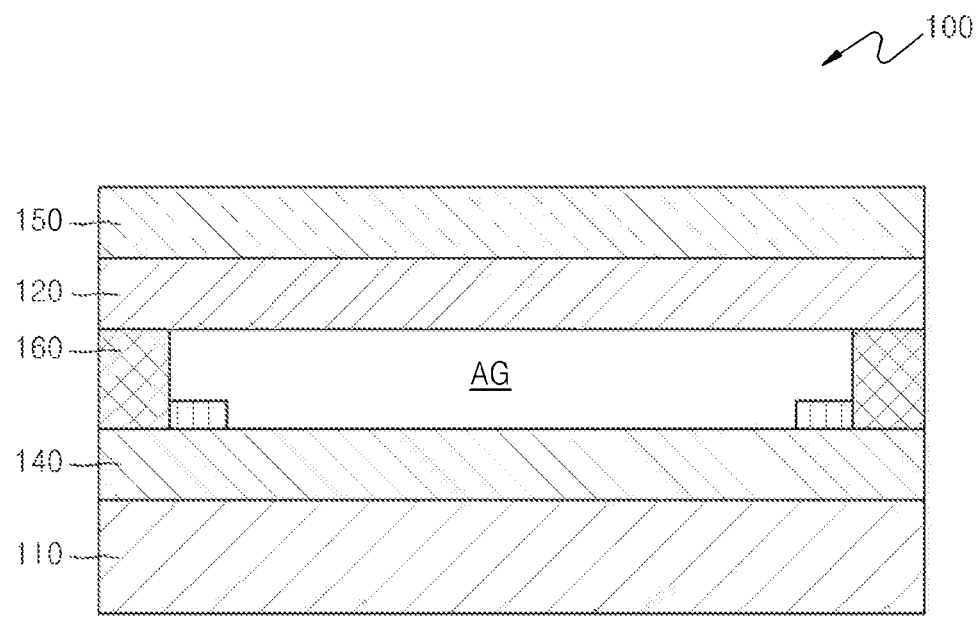
FIG. 1 is a cross-sectional view of a flexible display device according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

A flexible display device according to an embodiment of the present invention will be described below in more detail with reference to the accompanying drawings. Those components that are the same or are in correspondence are rendered the same reference numeral regardless of the figure number, and redundant explanations are omitted.

In embodiments, a flexible display device can include a touch sensing panel. In such flexible display device, a warpage event can be utilized. The warpage of flexible display devices can be measured or determined as a value which can be used in an application software.

FIG. 1 illustrates a structure of a flexible display device 100 according to an embodiment of the present invention.

Referring to FIG. 1, the flexible display device 100 includes a flexible display unit 110 that displays an image, a flexible touch screen unit 120 disposed on or above the flexible display unit 110, an insulating film 140 interposed between the flexible display unit 110 and the flexible touch screen unit 120, and a cover window 150 disposed on the flexible touch screen unit 120.

The insulating film 140 is attached to one surface of the flexible display unit 110, i.e., a top surface of the flexible display unit 110 facing the flexible touch screen unit 120.

An air gap AG is formed between the flexible touch screen unit 120 and the insulating film 140. Spacers 160 are formed between the flexible touch screen unit 120 and the insulating film 140 along edges of facing surfaces of the flexible display unit 110 and the flexible touch screen unit 120 in order to form the air gap AG.

The flexible display unit 100 having the above structure includes a unit for measuring a degree of warpage of the flexible display unit 100 when it is bent in one direction.

Figure 2:
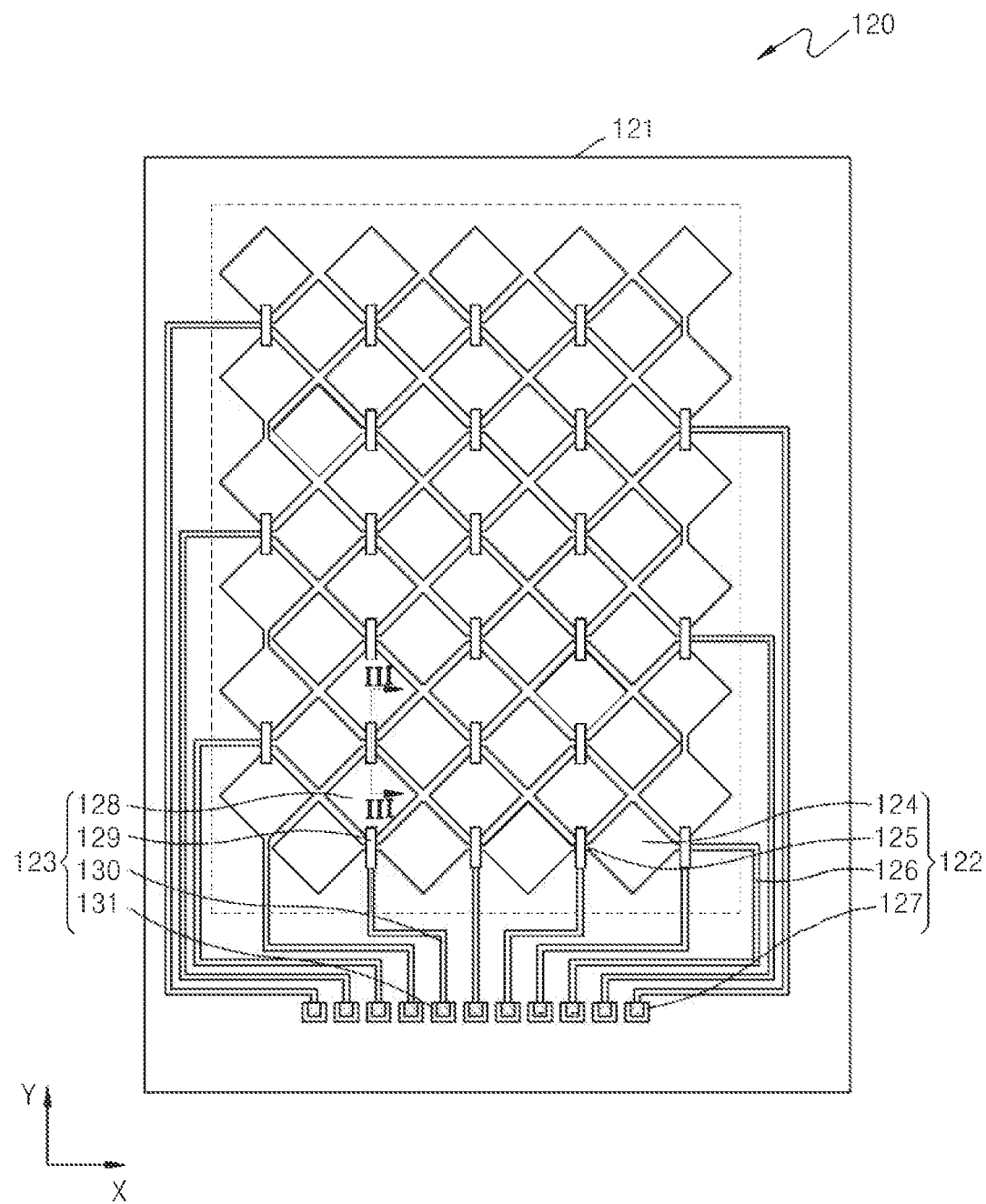
FIG. 2 is a plane view of a flexible touch screen unit of the flexible display device illustrated in FIG. 1.
Figure 3:
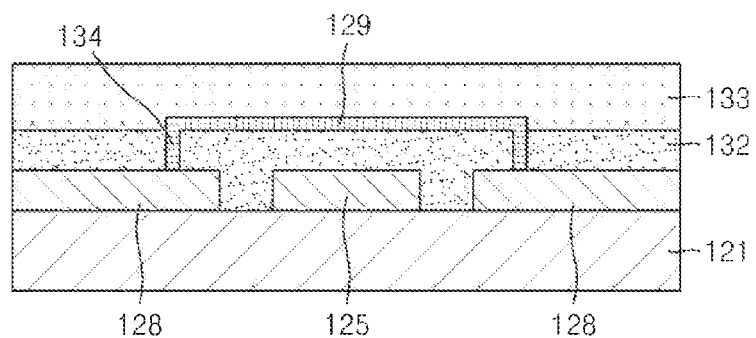
FIG. 3 is a cross-sectional view taken along a line III-III of FIG. 2.

FIG. 2 illustrates the flexible touch screen unit 120 of FIG. 1, and FIG. 3 is a cross-sectional view taken along a line of FIG. 2.

In embodiments, the flexible touch screen unit 120 according to the present embodiment is an electrostatic capacitive type touch unit. However, aspects of the present invention are not limited thereto, and the flexible touch screen unit 120 may be applied to one selected from the group consisting of a resistive type touch unit, an electro-magnetic type touch unit, a surface acoustic wave type touch unit, a saw type touch unit, and an infrared type touch unit.

Referring to FIGS. 2 and 3, the flexible touch screen unit 120 includes a flexible touch substrate 121. A plurality of first electrode patterns 122 and a plurality of second electrode patterns 123 are alternately disposed on the flexible touch substrate 121. The plurality of first electrode patterns 122 are arranged parallel to each other and extend along a first direction (X-direction) parallel to a surface of the flexible touch substrate 121.

In embodiments, the plurality of second electrode patterns 123 are disposed to neighbor the first electrode patterns 122. The second electrode patterns 123 are parallel to each other and extend along a second direction (Y-direction) parallel to a surface of the flexible touch substrate 121.

The first electrode patterns 122 include a plurality of first main bodies or first electrodes 124, a plurality of first connectors 125, a plurality of extension portions 126, and a plurality of first contact portions 127.

In embodiments, the plurality of first main bodies 124 are diamond-shaped. In one of the plurality of first electrode patterns, the plurality of first main bodies 124 are aligned along the first direction (X-direction). Each of the plurality of first connectors 125 is formed between two neighboring first main bodies 124 that are arranged along the first direction (X-direction). The first connectors 125 electrically connect the first main bodies 124.

Each of the plurality of first extension portions 126 are formed from one end of the outermost first main body 124 among the plurality of first main bodies 124 connected to each other in one of the plurality of first electrode patterns. The first extension portions 126 extend to edges of the flexible touch substrate 121 and are gathered on one side of the flexible touch substrate 121. The plurality of first contact portions 127 are formed on ends of the first extension portions 126.

The second electrode patterns 123 include a plurality of second main bodies or second electrodes 128, a plurality of second connectors 129, a plurality of second extension portions 130, and a plurality of second contact portions 131.

In embodiments, the plurality of second main bodies 128 are diamond-shaped. In one of the plurality of second electrode patterns, the plurality of second main bodies 128 are aligned along the second direction (Y-direction).

Each of the plurality of second extension portions 130 extend from one end of the outermost second main body 128 among the plurality of second main bodies 128 connected to each other in one of the plurality of first electrode patterns. The second extension portions 130 extend to the edges of the flexible touch substrate 121. The second extension portions 130 are gathered on one side of the flexible touch substrate 121. The plurality of second contact portions 131 are formed on ends of the second extension portions 130.

A pair of first main bodies 124 that are adjacent to each other are connected to each other via the first connector 125 disposed on the same plane as a plane on which the pair of first main bodies 124 are disposed. Contrary to this, a pair of second main bodies 128 that are adjacent to each other are connected to each other via the second connector 129 disposed on a different plane from a plane on which the pair of second main bodies 128 are disposed in order to avoid interference between the pair of second main bodies 128 and the first electrode patterns 122.

In more detail, an insulating layer 132 that covers all of the first electrodes 124, a plurality of first connectors 125 and the second electrodes 128, is formed on the flexible touch substrate 121. The insulating layer 132 insulates the first electrode patterns 122 and the second electrode patterns 123 from one another.

The insulating layer 132 includes contact holes 134, each of which is formed in an area corresponding to a corner of one of the second main bodies 128. The contact holes 134 are formed in areas in which the first electrode patterns 122 and the second electrode patterns 123 cross one another. Each of the second connectors 129 is formed through two neighboring contact holes 134 and connects two neighboring second main bodies 128 across the insulating layer 132.

By using the above-described structure, a short circuit between the first electrode patterns 122 and the second electrode patterns 123 may be prevented.

The first electrode patterns 122 and the second electrode patterns 123 may be formed of a transparent material used in forming transparent conductive layers, such as indium tin oxide (ITO), indium zinc oxide (IZO), zinc oxide (ZnO), $In_2O_3$, and the like. In addition, the first electrode patterns 122 and the second electrode patterns 123 may be formed using a photolithography process.

That is, the first electrode patterns 122 and the second electrode patterns 123 may be formed by patterning transparent conductive layers formed using a method, such as deposition, spin coating, sputtering, ink-jet, or the like.

A passivation and/or planarization layer 133 is formed on the insulating layer 132 in order to cover the second connectors 129 for connecting the plurality of second electrode patterns 123.

The flexible touch screen unit 120 having the above structure can sense changes of electrostatic capacitance between the first electrode patterns 122 and the second electrode patterns 123 when an input unit, such as a finger, is close to or contacts the flexible touch substrate 121.

Figure 4:
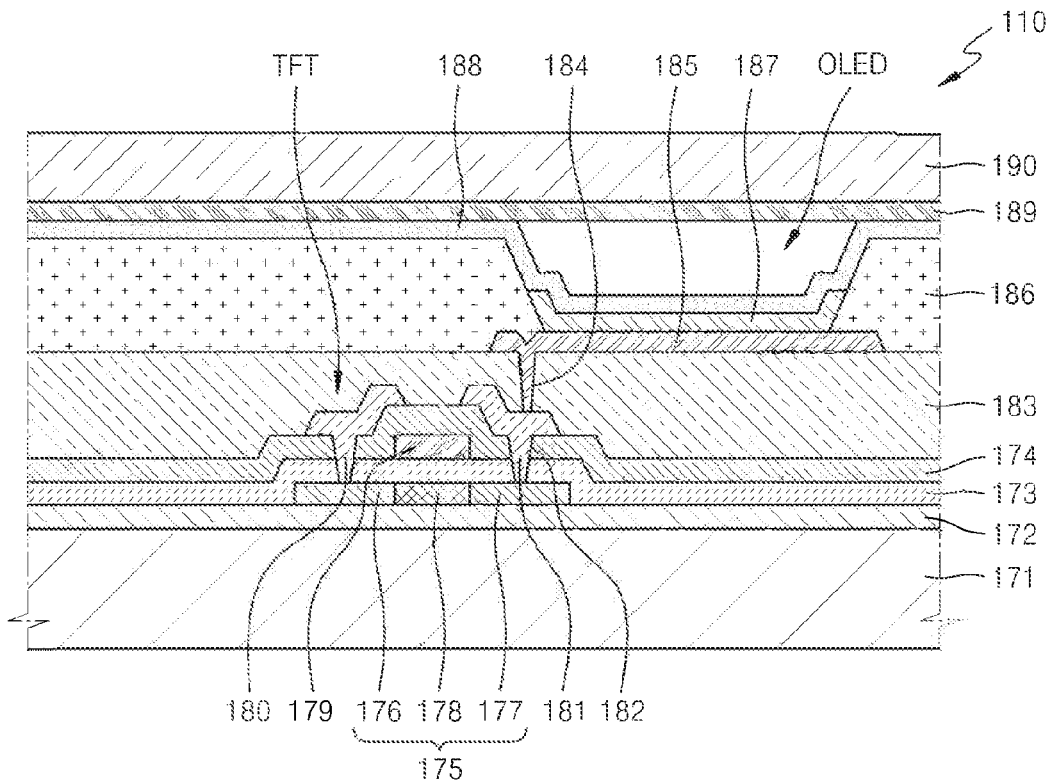
FIG. 4 is a cross-sectional view of a flexible display unit of the flexible display device of FIG. 1.

FIG. 4 illustrates one sub-pixel of the flexible display unit 110 of FIG. 1.

The flexible display unit 110 according to the present embodiment is an organic light-emitting display unit. However, aspects of the present invention are not limited thereto, and the flexible display unit 110 may be applied to other display units, such as a liquid crystal display (LCD) unit, an electroluminescent display unit, a plasma display unit, a field emission display unit, an electrophoresis display unit, and the like.

Referring to FIG. 4, the flexible display unit 110 includes a flexible display substrate 171. The flexible display substrate 171 may be formed of material that has low specific gravity compared to a glass substrate and is light-weight, is not fragile and is flexible, for example, a polymer material used in forming a flexible plastic film.

As the thickness of the flexible display substrate 171 decreases, the flexible display substrate 171 is more lightweight and is more advantageous to implement a thin layer display. However, when the flexible display substrate 171 is manufactured, it has to have a thickness at which loads of an element and a thin layer to be formed on the flexible display substrate 171 may be maintained by the flexible display substrate 171.

To this end, the flexible display substrate 171 may be a thin layer type substrate having a thickness of about 10 to 100 micrometers. When the thickness of the flexible display substrate 171 is 10 micrometers or less, shapes of an element and a thin layer to be formed on the flexible display substrate 171 when the flexible display substrate 171 is manufactured, cannot be stably maintained. When the thickness of the flexible display substrate 171 is 100 micrometers or more, the flexible display substrate 171 cannot maintain flexible characteristics easily.

The flexible display substrate 171 may be formed of a polymer material, such as yimide (PI), polycarbonate (PC), polyethersulphone (PES), polyethylene terephthalate (PET), polyethylenenaphthalate (PEN), polyarylate (PAR), a fiber glass reinforced plastic (FRP), or the like.

A first barrier layer 172 is formed on the flexible display substrate 171. The first barrier layer 172 may be formed by using an inorganic material, such as SiOx, SiNx, SiON, AlO, AlON, or the like, an organic material, such as acryl, polyimide, or the like, or by alternately stacking an organic material and an inorganic material. The first barrier layer 172 serves to block oxygen and moisture, to prevent diffusion of moisture or an impurity formed from the flexible display substrate 171, and to adjust a thermal transfer speed when a semiconductor is crystallized so that crystallization of the semiconductor may be well performed.

A thin film transistor (TFT) is formed on or above the first barrier layer 172. The TFT according to the present embodiment is a top gate type TFT. However, aspects of the present invention are not limited thereto, and other types of TFTs, such as a bottom gate type TFT, and the like, may be formed.

As in the present embodiment, in the case of a top gate type TFT, a semiconductor active layer 175, a gate insulating layer 173, a gate electrode 179, an interlayer insulating layer 174, a source electrode 180, a drain electrode 181, and a passivation and/or planarization layer 183, and the like are formed on the first barrier layer 172.

When the semiconductor active layer 175 is formed of polysilicon, amorphous silicon is formed and is crystallized to be changed to polysilicon.

Various methods, such as rapid thermal annealing (RTA), solid phase crystallization (SPC), eximer laser annealing (ELA), metal induced crystallization (MIC), metal induced lateral crystallization (MILC), sequential lateral solidification (SLS), and the like, may be applied to a method of crystallizing amorphous silicon. However, a method that does not require a high temperature heating process may be used in the flexible display substrate 171 according to embodiments of the present invention.

For example, when amorphous silicon is crystallized using a low temperature poly-silicon (LTPS) process, the semiconductor active layer 175 is activated by irradiating laser onto the semiconductor active layer 175 for a short time so that the whole process may be performed at a temperature of 300° C. or less. Thus, a TFT may be formed using the flexible display substrate 171 formed of a polymer material.

The semiconductor active layer 175 includes a source region 176 and a drain region 177 by doping an N-type or P-type impurity ion into the semiconductor active layer 175. A region between the source region 176 and the drain region 177 is a channel region 178 that is not doped with an impurity.

A gate insulating layer 173 is deposited on the semiconductor active layer 175. The gate insulating layer 173 has a single layer formed of $SiO_2$, or a double layer structure of $SiO_2$ and $SiN_x$.

A gate electrode 179 is formed in a predetermined region of an upper portion of the gate insulating layer 173. The gate electrode 179 is connected to a gate line (not shown) for applying a TFT on/off signal. The gate electrode 179 is formed of single metal or multiple metals or may be formed in a single layer structure of Mo, MoW, Cr, Al, an Al alloy, Mg, Ni, W, Au, or the like, or a multi-layer structure formed of a mixture thereof.

The interlayer insulating layer 174 is formed on or above the gate electrode 179, and the source electrode 180 is electrically connected to the source region 176 and the drain electrode 181 is electrically connected to the drain region 177 via a contact hole 182.

The interlayer insulating layer 174 may be formed of an insulating material, such as $SiO_2$, $SiN_x$, or the like, an insulating organic material, or the like. The contact hole 182 may be formed by selectively removing the gate insulating layer 173 and the interlayer insulating layer 173, and the interlayer insulating layer 174.

A passivation and/or planarization layer 183 is formed on or above the source electrode 180 and the drain electrode 181. The passivation and/or planarization layer 183 protects a lower TFT and planarizes the lower TFT. The passivation and/or planarization layer 183 may have various shapes and may be modified in various ways, such as being formed using an organic material, such as benzocyclobutene (BCB), acryl, or the like, or an inorganic material, such as SiNx, or the like, may have a single layer structure, a double layer structure, or a multi-layer structure.

A display device is formed on or above the TFT. In the present embodiment, an organic light-emitting display device has been illustrated. However, aspects of the present invention are not limited thereto, and various display devices may be used.

On or above the TFT, a first electrode 185 is electrically connected to one of the source electrode 180 and the drain electrode 181 via a contact hole 184 in order to form the organic light-emitting display device.

The first electrode 185 functions as an anode among electrodes disposed on the organic light-emitting device and may be formed of various conductive materials. The first electrode 185 may be a transparent electrode or a reflective electrode depending on an organic-lighting emitting device to be formed.

For example, when the first electrode 185 is used as a transparent electrode, the first electrode 185 may include ITO, IZO, ZnO, $In_2O_3$, or the like. When the first electrode 185 is used as a reflective electrode, the first electrode 185 may be formed by forming a reflective layer by using Ag, Mg, Al, Pt, Pd, Au, Ni, Nd, Ir, Cr, and a compound thereof and by forming ITO, IZO, ZnO, $In_2O_3$, or the like on the reflective layer.

A pixel defining layer (PDL) 186 is formed on or above the passivation and/or planarization layer 183 by using an organic material in order to cover part of the first electrode 185 of the organic light-emitting device.

An organic layer 187 is formed on the first electrode 185 in a portion of the first electrode 185 exposed to the outside by etching part of the pixel defining layer 186. A second electrode 188 of the organic light-emitting device is formed on the organic layer 187.

The first electrode 185 and the second electrode 188 are insulated from each other by the organic layer 187, and voltages having different polarities are applied to the organic layer 187 so that light may be emitted from the organic layer 187.

In the present embodiment, the organic layer 187 is patterned to correspond to each sub-pixel, i.e., each first patterned electrode 185. However, this is for conveniences of explanation of a structure of a sub-pixel, and the organic layer 187 may be formed as one body with an organic layer 187 in another adjacent sub-pixel. In addition, part of the organic layer 187 is formed in each sub-pixel, and the other part of the organic layer 187 may be formed as one body with an organic layer 187 in another adjacent sub-pixel, and thus various modifications may be available.

The organic layer 187 may be formed of a low molecular weight organic material or a polymer organic material.

When the organic layer 187 is formed of a low molecular weight organic material, the organic layer 187 may be formed in a single structure consisting of a hole injection layer (HIL), a hole transport layer (HTL), an emissive layer (EML), an electron transport layer (ETL), and an electron injection layer (EIL), or a composite structure thereof.

Available organic materials when the organic layer 187 is formed of a low molecular weight organic material may be copper phthalocyanine (CuPc), N,N'-Di(naphthalene-1-yl)-N,N'-diphenyl-benzidine (NPB), and tris-8-hydroxyquinoline aluminum (Alq3), or the like. These low molecular weight organic materials may be formed using vacuum deposition using masks, or the like.

When the organic layer 187 is formed of a polymer organic material, the organic layer 187 may have a structure consisting of a HTL and an EML. In this regard, PEDOT may be used as the HTL, and a poly-phenylenevinylene (PPV)-based polymer organic material or a polyfluorene-based polymer organic material may be used as the EML, and these polymer organic materials may be formed using screen printing, ink-jet printing, or the like.

Aspects of the present invention are not limited thereto, and various embodiments may be applied to the above-described organic layer 187.

The second electrode 188 is a transparent electrode like the first electrode 185 and may be formed as a reflective electrode.

When the second electrode 188 is used as a transparent electrode, a layer formed of Li, Ca, LiF/Ca, LiF/Al, Al, and Mg each having a small work function and a compound thereof, and an auxiliary electrode that is formed of a material for forming a transparent electrode, such as ITO, IZO, ZnO, or $In_2O_3$, may be formed on the transparent electrode.

When the second electrode 188 is used as a reflective electrode, the reflective electrode is formed by vapour depositing Li, Ca, LiF/Ca, LiF/Al, Al, Mg, and a compound thereof on the entire surface of the second electrode 188.

The first electrode 185 is a transparent electrode. However, when the first electrode 185 is used as a reflective electrode, the first electrode 185 may be formed to correspond to a shape of an aperture of each sub-pixel. The second electrode 188 is a transparent electrode but may be formed by depositing a reflective electrode on the entire surface of a display region. The second electrode 188 does not need to be deposited on the entire surface of the display region and may be formed in various patterns. In this case, the first electrode 185 and the second electrode 188 may be stacked in such a way that their positions are opposite to each other.

A sealing film 190 is combined with an upper portion of the organic light-emitting device. The sealing film 190 may be formed of substantially the same material as material used in forming the flexible display substrate 110. The sealing film 190 may be a thin film that may be freely bent. Alternatively, the organic light-emitting device may be sealed by manufacturing the organic light-emitting device and by stacking an organic and/or inorganic film on the organic light-emitting device.

A second barrier layer 189 may be formed on one surface of the sealing film 190 that faces the organic light-emitting device. The second barrier layer 189 may be formed of an inorganic material, such as SiOx, SiNx, SiON, AlO, AlON, or the like, an organic material such as acryl, polyimide, or the like, or by stacking an organic material and an inorganic material alternately.

The second barrier layer 189 serves to block oxygen and moisture, to prevent diffusion of moisture or an impurity formed from the sealing film 190, and to adjust a thermal transfer speed when a semiconductor is crystallized so that crystallization of the semiconductor may be well performed.

Here, a conductive layer 141 that contacts the flexible touch screen unit 120 selectively is formed on the insulating film 140 in order to measure a degree of warpage of the flexible display device 100 when the flexible display device 100 is bent in one direction.

Figure 5:
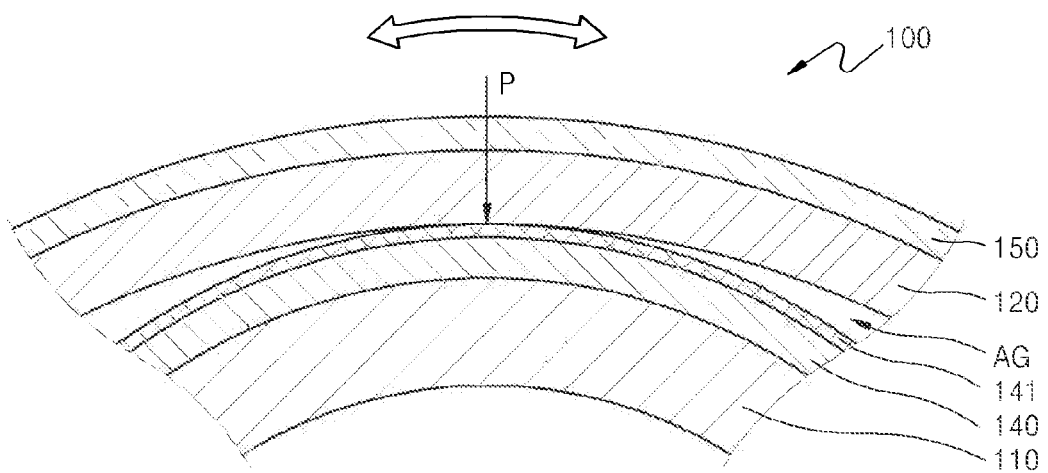
FIG. 5 is a cross-sectional view of warpage of the flexible display device of FIG. 1.
Figure 6:
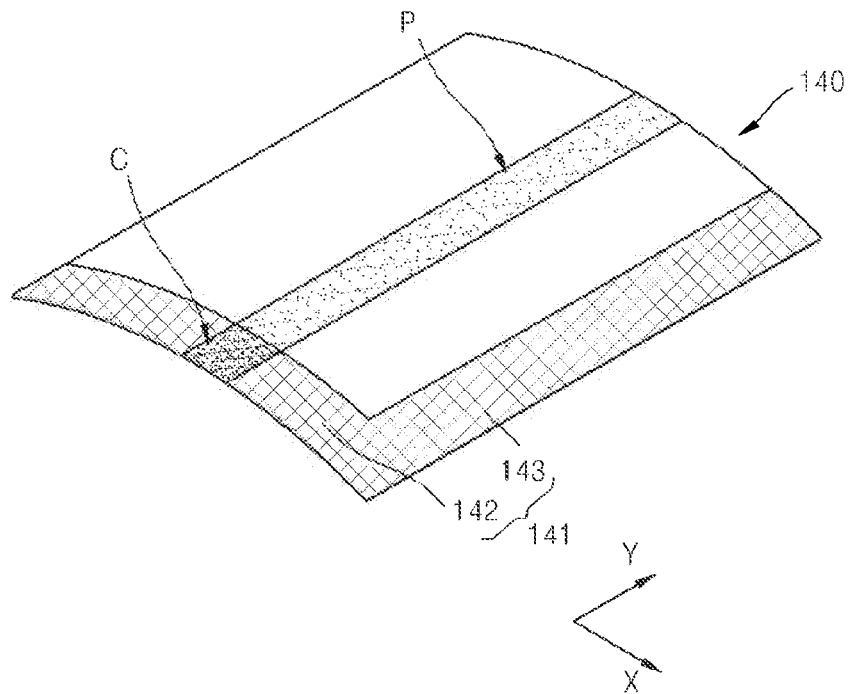
FIG. 6 is a perspective view of warpage of the flexible touch screen unit and an insulating film of FIG. 5.

FIG. 5 illustrates warpage of the flexible display device 100 of FIG. 1, and FIG. 6 illustrates a state where the flexible touch screen unit 120 contacts the insulating film 140 of FIG. 5.

Referring to FIGS. 5 and 6, when the flexible touch screen unit 120 is bent, as indicated by arrow, an air gap AG between the flexible touch screen unit 120 and the insulating film 140 is reduced at a point P of warpage so that the flexible touch screen unit 120 contacts the insulating film 140 selectively.

In this case, a conductive layer 141 is patterned in a particular shape on the insulating film 140 in order to sense a portion in which the flexible touch screen unit 120 contacts the insulating film 140 or the conductive layer 141 when the flexible touch screen unit 120 is bent in a particular region P.

To this end, a first conduction portion 142 is formed on a top surface of the insulating film 140 that faces the flexible touch screen unit 120 to extend along a first edge (X-direction) of the insulating film 140, and a second conduction portion 143 is formed to extend along a second edge (Y-direction) that crosses the first edge of the insulating film 140. The first conduction portion 142 and the second conduction portion 143 may be connected to each other or separated from each other.

Figure 7:
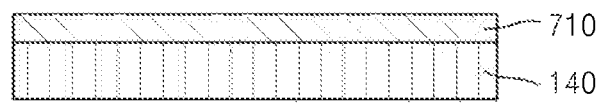
FIG. 7 is a cross-sectional view of a modified example of the insulating film of FIG. 6.
Figure 8:
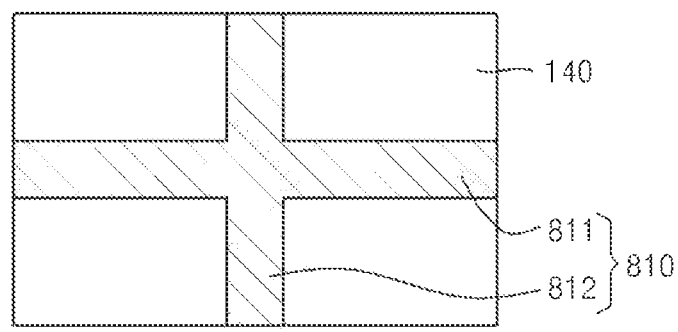
FIG. 8 is a plane view of another modified example of the insulating film of FIG. 6.
Figure 9:
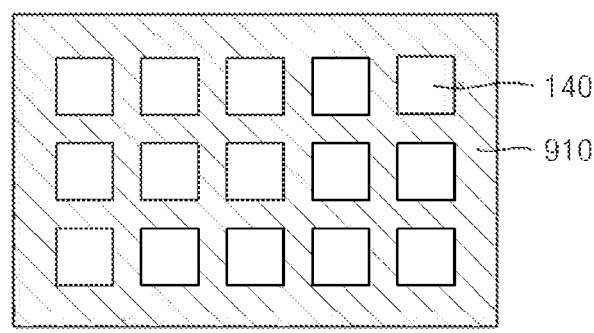
FIG. 9 is a plane view of another modified example of the insulating film of FIG. 6.

Alternatively, as illustrated in FIG. 7, a conductive layer 710 may be formed on the substantially entire top surface of the insulating film 140, or as illustrated in FIG. 8, a conductive layer 810 includes a first conduction portion 811 formed across a first direction of the top surface of the insulating film 140 and a second conduction portion 812 formed across a second direction that crosses the first direction, or as illustrated in FIG. 9, a conductive layer 910 may be formed in a lattice shape on the top surface of the insulating film 140, and aspects of the present invention are not limited thereto.

The conductive layer 141 may be formed of a transparent material used in forming a transparent conductive layer, for example, ITO, IZO, ZnO, $In_2O_3$, or the like.

In embodiments, the insulating film 140 may function as a polarization plate or polarizer. When the insulating film 140 is used as a polarization plate, the insulating film 140 can serve to prevent reflection of the external light so that visibility of an image displayed on the flexible display unit 110 may be improved.

In embodiments, the conductive layer 141 may be formed on the surface of an outermost film, such as the sealing film 190 disposed on the flexible display unit 110.

An operation of the flexible display device 100 having the above structure will now be described with reference to FIGS. 1 through 6.

The flexible display unit 110, the insulating film 140 having the conductive layer 141 formed on the flexible display unit 110, and the flexible touch screen unit 120 having an air gap formed between the flexible touch screen unit 120 and the insulating film 140 by the spacer 160 are bent in one direction.

When the flexible display unit 110, the insulating film 110, and the flexible touch screen unit 120 are bent in the same direction, a bent portion of the flexible touch screen unit 120 contacts a portion of the surface of the insulating film or the conductive layer 141 which faces the flexible touch screen unit 120. The position or area of the contact portion can depend on a degree of warpage.

In embodiments, when the flexible touch screen unit 120 is bent in a particular point P, the air gap AG is decreased at the bent point P, and a particular region of the flexible touch screen unit 120 contacts the top surface of the conductive layer 141 or the insulating film 140.

In this case, since the insulating film 140 has an insulating property, the flexible touch screen unit 120 contacting the particular region P of the conductive layer 141 patterned at an edge of the insulating film 140 can be detected.

When the flexible touch screen unit 120 contacts the conductive layer 141 formed on the insulating film 140, electrostatic capacitances can vary at the contact point at which the flexible touch screen unit 120 contacts the conductive layer 141. A variation in electrostatic capacitances at the contact point is read by an integrated circuit (IC) disposed on the flexible touch screen unit 120 so that a degree of warpage of the flexible display device 100 may be determined.

In embodiments, when the flexible touch screen unit 120 and the conductive layer 141 are bent in the same direction and contact each other, electrostatic capacitances between the first electrode patterns 122 and the second electrode patterns 123 patterned on the flexible touch screen unit 120 can vary or change. An X-coordinate and a Y-coordinate of the contact position or the contact area can be determined using the IC, and the determined position or area is transmitted to a central processing unit (CPU). An user interface (UI) is executed so as to measure the degree of warpage of the flexible display device 100.

Figure 10:
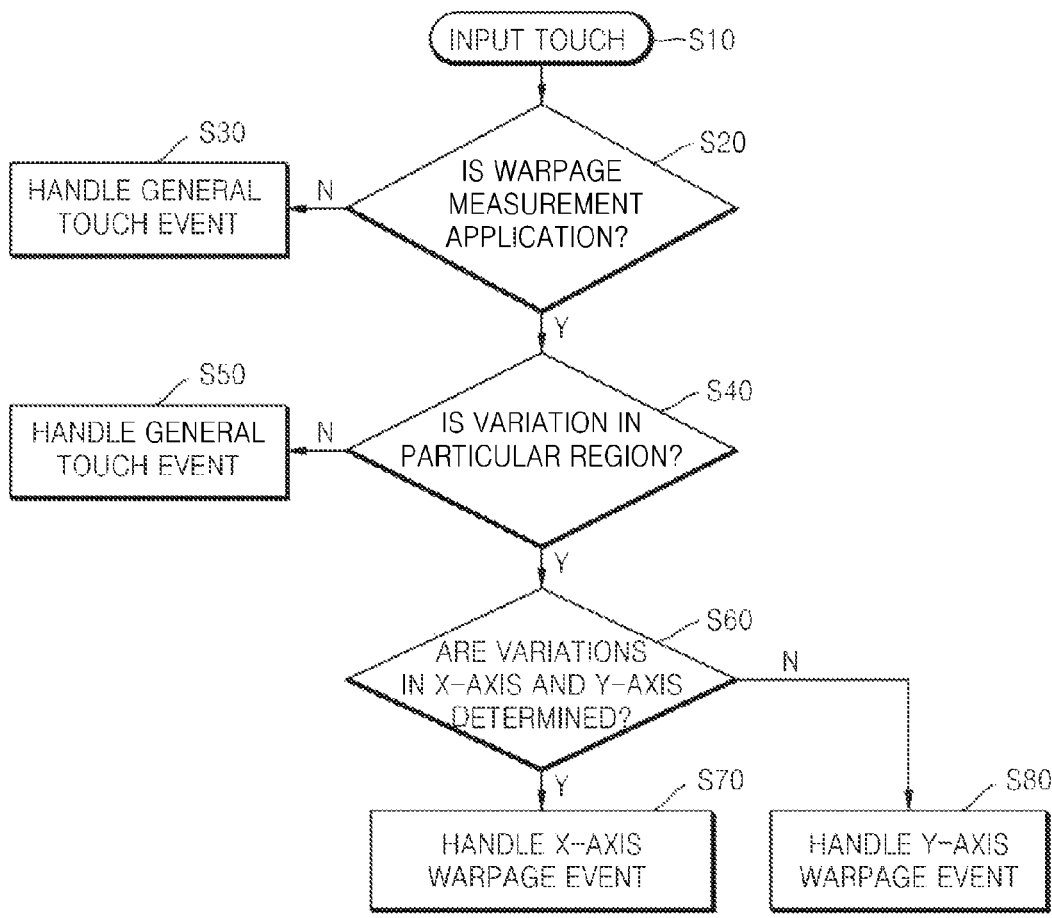
FIG. 10 is a flowchart illustrating warpage event handling by using the flexible display device of FIG. 1.

FIG. 10 is a flowchart illustrating warpage event handling by using the flexible display device 100 of FIG. 1.

Referring to FIG. 10, the flexible display unit 110, the insulating film 140 disposed on the flexible display unit 110 and having the conductive layer 141, and the flexible touch screen unit 120 disposed with an air gap between the flexible touch screen unit 120 and the insulating film 140 are touched (S10).

When the flexible display device 100 is touched using an input unit, a type of a warpage measurement application (hereinafter referred to as an app) installed on the flexible display device 100 is determined. For example, whether the app is a general touch event, such as a main menu app of the flexible display device 100, or a warpage event, such as an image menu app that requires a warpage event, such as image enlargement, or the like is determined (S20).

If it is determined that a warpage event of the flexible display device 100 is not required, a general touch event is handled (S30).

On the other hand, if it is determined that a warpage event of the flexible display device 100 is required, warpage event handling proceeds to the next operation, and whether there is a variation in a particular region of the flexible display device 100 is determined. That is, it is determined whether the flexible touch screen unit 120 contacts a particular region of the conductive layer 141 formed on the insulating film 140 as the flexible display device 100 is bent (S40).

If it is determined that there is no variation in the particular region of the flexible display device 100, a general touch event is handled (S50).

On the other hand, if it is determined that there is a variation in the particular region of the flexible display device 100, variations in the X-axis and the Y-axis of the flexible display device 100 are determined (S60).

Thus, if it is determined that there is a variation in the X-axis of the flexible display device 100, a warpage event in the X-direction is handled (S70), and if it is determined that there is a variation in the Y-axis of the flexible display device 100, a warpage event in the Y-direction is handled (S80).

As described above, in a flexible display device and a method of sensing warpage by using the flexible display device according to the one or more embodiments of the present invention, a degree of warpage of the flexible display device may be measured and thus may be utilized in various warpage events of the flexible display device by using warpage values.

While embodiments of the present invention have been particularly shown and described, it will be understood by those of ordinary skill in the art that various changes in form and details may be made therein without departing from the spirit and scope of the present invention as defined by the following claims.

What is claimed is:

1. A flexible display device comprising:
a flexible display unit configured to display an image;
a flexible touch screen unit disposed over the flexible display unit, wherein the touch screen unit comprising a touch-sensitive surface that faces the flexible display unit;
an insulating film interposed between the flexible display unit and the flexible touch screen unit;
a conductive layer interposed between the insulating film and the flexible touch screen unit; and
a spacer providing a gap between the flexible touch screen unit and the conductive layer such that the conductive layer does not contact the touch-sensitive surface of the flexible touch screen unit when the flexible display device is not bent, wherein the flexible display unit and the flexible touch screen unit are configured such that part of the conductive layer contacts the touch-sensitive surface when the flexible display device bends at a certain degree.

2. The flexible display device of claim 1, wherein the insulating film is attached to a top surface of the flexible display unit, and
the flexible touch screen unit is spaced from the insulating film by the spacer, and
a gap is formed between the flexible touch screen unit and the insulating film.

3. The flexible display device of claim 2, wherein the conductive layer comprises a patterned shape formed over a surface of the insulating film that faces the flexible touch screen unit.

4. The flexible display device of claim 2, wherein the conductive layer comprises a first conduction portion extending along a first edge of the insulating film and a second conduction portion extending along a second edge that crosses the first edge and connected to the first conduction portion.

5. The flexible display device of claim 2, wherein the conductive layer is formed over the substantially entire surface of the insulating film facing the flexible touch screen unit.

6. The flexible display device of claim 2, wherein the conductive layer comprises a first conduction portion extending along a first direction parallel a surface of the insulating film and a second conduction portion extending along a second direction that crosses the first direction and is parallel to the surface of the insulating film.

7. The flexible display device of claim 2, wherein the conductive layer comprises a lattice pattern formed over the insulating film.

8. The flexible display device of claim 1, wherein the conductive layer is formed of a transparent material.

9. The flexible display device of claim 1, wherein the insulating film comprises a polarizer plate.

10. The flexible display device of claim 1, wherein the flexible touch screen unit comprises one selected from the group consisting of an electrostatic capacitive type touch unit, a resistive type touch unit, an electro-magnetic type touch unit, a surface acoustic wave type touch unit, a saw type touch unit, and an infrared type touch unit.

11. The flexible display device of claim 1, wherein the flexible touch screen unit comprises:
    a flexible touch substrate;
    a plurality of electrode patterns comprising a plurality of first electrode patterns and a plurality of second electrode patterns formed over the flexible touch substrate; and
    an insulating layer insulating between the plurality of first electrode patterns and the plurality of second electrode patterns, and
    the first electrode patterns and the second electrode patterns configured to sense contact between the flexible touch screen unit and the conductive layer so as to generate electrical signals.

12. The flexible display device of claim 11, wherein a plurality of first electrode patterns are arranged to be spaced apart from each other in a first direction parallel to a surface of the flexible touch substrate, and
    a plurality of second electrode patterns are arranged to be spaced apart from each other in a second direction that crosses the first direction and is parallel to the surface of the flexible touch substrate.

13. The flexible display device of claim 12, wherein the first electrode patterns and the second electrode patterns are placed at the substantially same elevation with reference to the flexible touch substrate and are buried to be insulated from each other by an insulating layer.

14. The flexible display device of claim 13, wherein the insulating layer comprises contact holes formed in areas in which the first electrode patterns and the second electrode patterns cross one another, and
    each of the plurality of first electrode patterns comprises first electrodes electrically connected by a plurality of first connectors, and
    each of the plurality of second electrode patterns comprises second electrodes are electrically connected by a plurality of second connectors that are formed in the contact holes and cross the insulating layer.

15. The flexible display device of claim 14, wherein a passivation layer is further formed over the insulating layer in order to cover the plurality of second connectors.

16. The flexible display device of claim 1, wherein a cover window is further formed over the flexible touch screen unit.

17. The flexible display device of claim 1, wherein the flexible display unit comprises:
    a flexible display substrate;
    a thin film transistor formed over the flexible display substrate; and
    an organic light-emitting device connected to the thin film transistor and comprising a first electrode, a second electrode, and an organic layer interposed between the first electrode and the second electrode.

18. A method of sensing warpage of a flexible display device, the method comprising:
    providing a flexible display device which comprises:
        a flexible display unit,
        a flexible touch screen unit disposed over the flexible display unit, wherein the touch screen unit comprising a touch-sensitive surface that faces the flexible display unit,
        an insulating film interposed between the flexible display unit and the flexible touch screen unit,
        a conductive layer interposed between the insulating film and the flexible touch screen, and
        a spacer providing a gap between the flexible touch screen unit and the conductive layer such that the conductive layer does not contact the touch-sensitive surface of the flexible touch screen unit when the flexible display device is not bent, wherein the flexible display unit and the flexible touch screen unit are configured such that part of the conductive layer contacts the touch-sensitive surface when the flexible display device bends at a certain degree;
    and
    measuring a degree of warpage of the flexible display device.

19. The method of claim 18, wherein the flexible touch screen unit measures variation in electrostatic capacitance.

20. The method of claim 19, wherein a plurality of first electrode patterns and a plurality of second electrode patterns are formed over a flexible touch substrate of the flexible touch screen unit, and wherein a variation in electrostatic capacitance between the plurality of first electrode patterns and the plurality of second electrode patterns at a point where the flexible touch screen unit contacts the conductive layer when the flexible display device is bent is measured.

21. A method of operating a flexible display device, the method comprising:
    providing a flexible display device comprising:
        a flexible display unit,
        a flexible touch screen unit disposed over the flexible display unit, wherein the touch screen unit comprising a touch-sensitive surface that faces the flexible display unit,
        an insulating film interposed between the flexible display unit and the flexible touch screen unit,
        a conductive layer interposed between the insulating film and the flexible touch screen unit, and
        a spacer providing a gap between the flexible touch screen unit and the conductive layer such that the conductive layer does not contact the touch-sensitive surface of the flexible touch screen unit when the flexible display device is not bent, wherein the flexible display unit and the flexible touch screen unit are configured such that part of the conductive layer contacts the touch-sensitive surface when the flexible display device bends at a certain degree;
    determining whether there is an application for measuring warpage of the flexible display device;

determining whether there is a warpage event of the flexible display device, determining whether the warpage event is a variation of a particular region of the flexible display device;

determining whether the flexible display device varies on an X-axis and a Y-axis; and handling the warpage event in each of directions of the X-axis and the Y-axis.

22. The method of claim 21, wherein, when a bent portion of the flexible touch screen unit contacts the conductive layer formed over the insulating film, the flexible display device senses a variation of electrostatic capacitances between first electrode patterns and second electrode patterns of the flexible touch screen unit at the bent portion so as to measure a degree of warpage of the flexible display device.

* * * * *